(12) United States Patent
Toeda et al.

(10) Patent No.: US 11,825,538 B2
(45) Date of Patent: Nov. 21, 2023

(54) RADIO COMMUNICATION SYSTEM AND RADIO BASE STATION

(71) Applicant: NTT DOCOMO, INC., Tokyo (JP)

(72) Inventors: Teruaki Toeda, Tokyo (JP); Anil Umesh, Tokyo (JP); Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 30 days.

(21) Appl. No.: 16/764,197

(22) PCT Filed: Nov. 16, 2017

(86) PCT No.: PCT/JP2017/041367
§ 371 (c)(1),
(2) Date: May 14, 2020

(87) PCT Pub. No.: WO2019/097652
PCT Pub. Date: May 23, 2019

(65) Prior Publication Data
US 2020/0396784 A1 Dec. 17, 2020

(51) Int. Cl.
*H04W 76/15* (2018.01)
*H04W 36/00* (2009.01)
(Continued)

(52) U.S. Cl.
CPC ........... *H04W 76/15* (2018.02); *H04W 16/32* (2013.01); *H04W 36/0069* (2018.08); *H04W 36/14* (2013.01); *H04W 92/20* (2013.01)

(58) Field of Classification Search
None
See application file for complete search history.

(56) References Cited

U.S. PATENT DOCUMENTS

2015/0124748 A1  5/2015  Park et al.
2015/0373759 A1* 12/2015  Wang .................. H04L 69/22
                                                370/329
(Continued)

FOREIGN PATENT DOCUMENTS

WO       2017005478 A1   1/2017

OTHER PUBLICATIONS

3GPP TSG-RAN WG2 Meeting #99bis; R2-1712050 "LS on supported bearer types in DC" RAN WG2; Prague, Czech Republic; Oct. 9-13, 2017 (2 pages).

(Continued)

*Primary Examiner* — Noel R Beharry
*Assistant Examiner* — Pamit Kaur
(74) *Attorney, Agent, or Firm* — Osha Bergman Watanabe & Burton LLP (57) ABSTRACT

In a radio communication system, a split bearer that passes from a core network to a secondary cell group and branches from gNB 100B included in the secondary cell group to eNB 100A included in a master cell group is set, and data is transmitted to a user equipment via thus set split bearer. The gNB 100B transmits, to the eNB 100A, Use of SCG Radio Resource that indicates whether to configure a split bearer that uses a radio resource between the user equipment and the gNB 100B. The eNB 100A sets the split bearer based on the received Use of SCG Radio Resource.

6 Claims, 5 Drawing Sheets

(51) Int. Cl.
    *H04W 16/32* (2009.01)
    *H04W 36/14* (2009.01)
    *H04W 92/20* (2009.01)

(56) References Cited

U.S. PATENT DOCUMENTS

| | | | |
|---|---|---|---|
| 2020/0008255 A1* | 1/2020 | Sharma | H04W 76/15 |
| 2020/0120750 A1* | 4/2020 | Liu | H04W 76/15 |
| 2020/0275519 A1* | 8/2020 | Sharma | H04W 80/02 |

OTHER PUBLICATIONS

3GPP TS 37.340 V1.2.0 "3rd Generation Partnership Project; Technical Specification Group Radio Access Network; Evolved Universal Terrestrial Radio Access (E-UTRA) and NR; Multi-connectivity; Stage 2 (Release 15)" Oct. 2017 (51 pages).

International Search Report issued in International Application No. PCT/JP2017/041367, dated Feb. 6, 2018 (5 pages).

Written Opinion issued in International Application No. PCT/JP2017/041367; dated Feb. 6, 2018 (4 pages).

Office Action issued in the counterpart Japanese Patent Application No. 2019-554130, dated May 18, 2021 (9 pages).

Extended European Search Report issued in counterpart European Patent Application No. 17932166.6, dated Oct. 16, 2020 (8 pages).

Nokia et al.; "QoS information transfer for SCG-split bearers"; 3GPP TSG-RAN WG3 Meeting #97, R3-173386; Berlin, Germany; EU, Aug. 21-25, 2017 (4 pages).

Office Action issued in the counterpart Indian Patent Application No. 202037024838, dated Jun. 17, 2021 (6 pages).

\* cited by examiner

RADIO COMMUNICATION SYSTEM AND RADIO BASE STATION

TECHNICAL FIELD

The present invention relates to a radio communication system and a radio base station capable of setting a split bearer.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) and the like is being considered.

Specifically, in Non-Patent Document 1, in dual connectivity (DC) that uses a radio base station of the LTE system and a radio base station of the NR system, a plurality of bearer configurations (split bearer (SCG Split bearer, and the like) each of which passes via a master cell group (MCG) or a secondary cell group (SCG) is being studied.

For example, in the DC in which a master node (MN) is a radio base station of the LTE system (hereinafter, "MeNB") and a secondary node (SN) is a radio base station of the NR system (hereinafter, "SgNB"), a configuration of SCG Split bearer (referred to as "Option 2x" for the sake of convenience) that passes via a core network (EPC (Evolved Packet Core))~SgNB~MeNB and is set with a user equipment (UE) is being studied. That is, in the configuration of the Option 2x, the radio resource between the UE and the SgNB is not used.

When this SCG Split bearer configuration is adopted, because it is possible to continue the use of a path of the core network~SgNB section even when the UE moves outside the coverage of the cell formed by the SgNB, it is not necessary to switch the path of the core network~SgNB section to the path of the core network~MeNB, that is, it is not necessary to change the bearer configuration. Accordingly, the load on the core network and the like can be reduced.

In particular, at the initial stage of introduction of the NR, it is expected that spot-like cells with a small coverage are formed by the SgNB. That is, because it is expected that the UE frequently enters and leaves the cell, it is considered that the configuration of such SCG Split bearer (Option 2x) is particularly useful from the viewpoint of reducing the load on the core network and the signaling amount.

PRIOR ART DOCUMENT

Non-Patent Document

Non-Patent Document 1: "LS on supported bearer types in DC", R2-1712050, 3GPP TSG-RAN WG2 Meeting #99bis, 3GPP, October 2017

SUMMARY OF THE INVENTION

When applying the above-explained configuration of the SCG Split bearer (Option 2x), the SgNB can use the SCG Split bearer (Option 2x) in addition to a normal SCG split bearer (referred to as "Option 3x" for the sake of convenience). The normal SCG split bearer is a split bearer for which both of sections, that is, the core network~SgNB~UE section, and that branches from the SgNB to the MeNB, and the core network~SgNB~MeNB~UE section, are set.

However, the MeNB cannot recognize which SCG Split bearer (Option 2x or Option 3x) configuration the SgNB is to use. Therefore, although irrespective of the fact that the SgNB can use the Option 2x configuration, if the UE moves outside the coverage of the cell formed by the SgNB, the MeNB switches the path of the core network~SgNB section to the core network~MeNB path, that is, there is concern that the MeNB can unnecessarily change the bearer configuration.

The present invention has been made in view of the above discussion. One object of the present invention is to provide radio communication system and a radio base station that can prevent unnecessary changing of a bearer configuration by a master node (MeNB) when a secondary node (SgNB) uses a split bearer that is set only in the core network~SgNB-~MeNB~UE section.

A radio communication system according to one aspect of the present invention is a radio communication system (radio communication system 10) in which a split bearer (split bearer $B_{SP}$) that passes from a core network (core network 20) to a secondary cell group and branches from other radio base station (gNB100B) included in the secondary cell group to a radio base station (eNB100A) included in a master cell group is set, and in which data is transmitted to a user equipment (UE 200) via thus set split bearer. The other radio base station includes a notification transmitting unit (SN notification transmitting unit 131) that transmits to the radio base station a bearer configuration notification (Use of SCG Radio Resource) that indicates whether to configure a split bearer that uses a radio resource between the user equipment and the other radio base station. The radio base station includes a notification receiving unit (SN notification receiving unit 130) that receives the bearer configuration notification, and a bearer setting unit (bearer setting unit 140) that sets the split bearer based on the bearer configuration notification received by the notification receiving unit.

A radio base station according to another aspect of the present invention is a radio base station (gNB 100B) included in a radio communication system in which a split bearer that passes from a core network to a secondary cell group and branches from the radio base station included in the secondary cell group to other radio base station (eNB 100A) included in a master cell group is set, and in which data is transmitted to a user equipment via thus set split bearer. The radio base station includes a notification transmitting unit that transmits to the radio base station a bearer configuration notification that indicates whether to configure a split bearer that uses a radio resource between the user equipment and the other radio base station.

A radio base station according to still another aspect of the present invention is a radio base station (eNB 100A) included in a radio communication system in which a split bearer that passes from a core network to a secondary cell group and branches from other radio base station (gNB 100B) included in the secondary cell group to the radio base station included in a master cell group is set, and in which data is transmitted to a user equipment via thus set split bearer. The radio base station includes a notification receiving unit that receives from the other radio base station a bearer configuration notification that indicates whether to configure a split bearer that uses a radio resource between the user equipment and the other radio base station; and a bearer setting unit that sets the split bearer based on the bearer configuration notification received by the notification receiving unit.

MODES FOR CARRYING OUT THE INVENTION

Exemplary embodiments will be described below with reference to the drawings. Note that the same or similar reference numerals are attached to the same functions and configurations, and the description thereof is appropriately omitted.

(1) Overall Schematic Configuration of Radio Communication System

Figure 1:
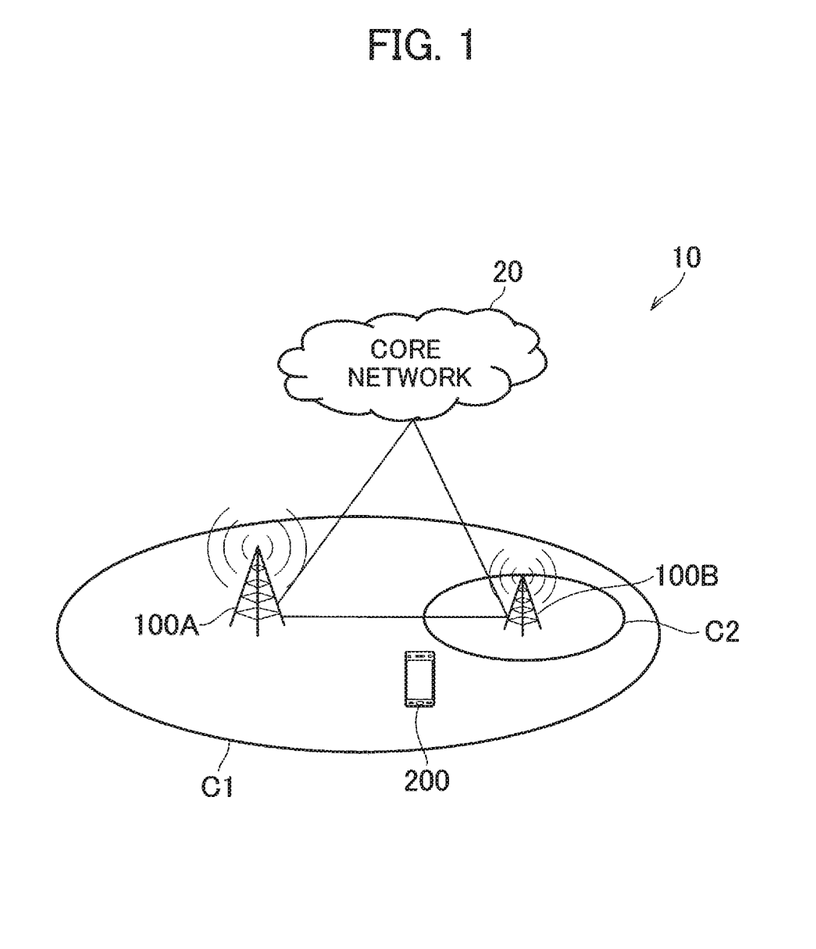
FIG. 1 is an overall schematic configuration diagram of a radio communication system 10.

FIG. 1 is an overall schematic configuration diagram of a radio communication system 10 according the present embodiment. The radio communication system 10 is a radio communication system according to Long Term Evolution (LTE) and 5G New Radio (NR). The radio communication system 10 includes a core network 20 and a user equipment 200 (hereinafter, "UE 200"). A radio base station 100A (hereinafter, "eNB 100A") and a radio base station 100B (hereinafter, "gNB 100B") are connected to the core network 20.

The core network 20 can be a core network of the LTE system (EPC (Evolved Packet Core)) or a core network of the NR system (NextGen Core).

In the present embodiment, the eNB 100A is a radio base station (eNB) of the LTE system and can constitute a master node. Hereinafter, the eNB 100A may be expressed as MeNB or MN as appropriate. The gNB 100B is a radio base station (gNB) of the NR system and can constitute a sec-ondary node. Hereinafter, the gNB 100B may be expressed as SgNB or SN as appropriate.

In the radio communication system 10, dual connectivity (DC) in which the UE 200 is capable of performing radio connection simultaneously with the eNB 100A and the gNB 100B is provided.

The eNB 100A forms a cell C1. The gNB 100B forms a cell C2. In the present embodiment, the cell C1 is a macro cell and the cell C2 is a small cell. That is, the cell C2 is smaller than the cell C1. Note that there can be more than one cell C1 and more than one cell. C2.

The cell C1 formed by the eNB 100A constitutes a master cell group (MCG). A secondary cell group (SCG) is configured by the cell C2 formed by the gNB 100B.

The eNB 100A and the gNB 100B are connected to the core network 20 (EPC) via S1-U interface. The eNB 100A and the gNB 100B are connected to each other via X interface (Xx/Xn). In the LTE, the X2 interface is a typical inter-base station interface.

Figure 2A:
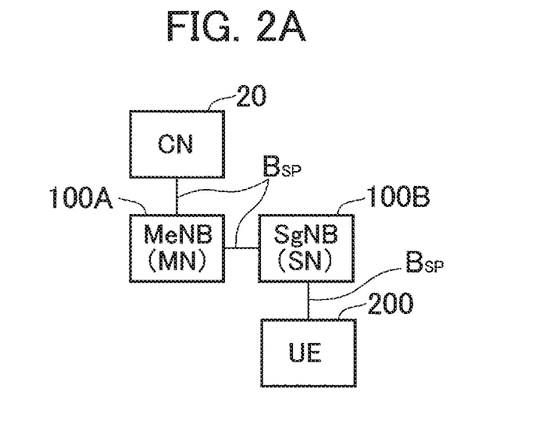
FIG. 2A is a diagram showing a configuration of a split bearer (SCG Slit Bearer) set in the radio communication system 10.
Figure 2B:
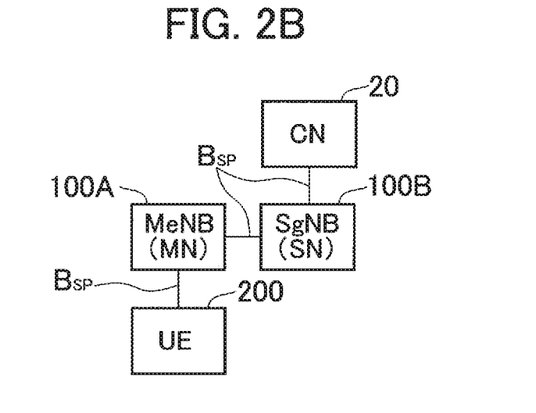
FIG. 2B is a diagram showing a configuration of a split bearer (SCG Split bearer, Option 2x) set in the radio communication system 10.
Figure 2C:
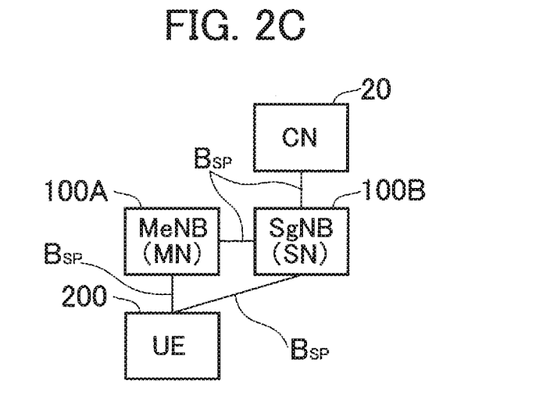
FIG. 2C is a diagram showing a configuration of a split bearer (SCG Split bearer, Option 3x) set in the radio communication system 10.

FIGS. 2A to 2C show configurations of split bearers set in the radio communication system 10. In the present embodiment, a split bearer $B_{SP}$ that passes from the core network 20 to the secondary cell group (SCG) and branches from the secondary cell group to the radio base station (eNB 100A) included in the master cell group (MCG), specifically, SCG Split bearer, is set.

Specifically, FIG. 2A shows a configuration of a bearer (MCG Split Bearer) that passes via the core network 20~eNB 100A (MeNB)~gNB 100B (SgNB)~UE 200. This bearer may be called "Option 2c" for the sake of convenience.

FIG. 28 shows a configuration of a bearer (SCG Split bearer) that passes via the core network 20~gNB 100B (SgNB)~eNB 100A (MeNB)~UE 200. In this bearer, radio resources (called SCG Radio Resource or NP Radio Resource) between the UF 200~gNB 100B are not used. This bearer may be referred to as Option 2x or SN anchored bearer for the sake of convenience.

FIG. 2C shows a configuration of a bearer (SCG Split bearer) that, in addition to the configuration of the bearer shown in FIG. 2B, is set between the UE 200~gNB 100B. That is, in this bearer, radio resources between the UE 200~gNB 100B are used. This bearer may be called Option 3x for the sake of convenience.

(2) Functional Block Configuration of Radio Communication System

A functional block configuration of the radio communication system 10 will be explained below. Specifically, a functional block configuration of the eNB 100A and the gNB 100B will be explained.

(2.1) eNB 100A

Figure 3:
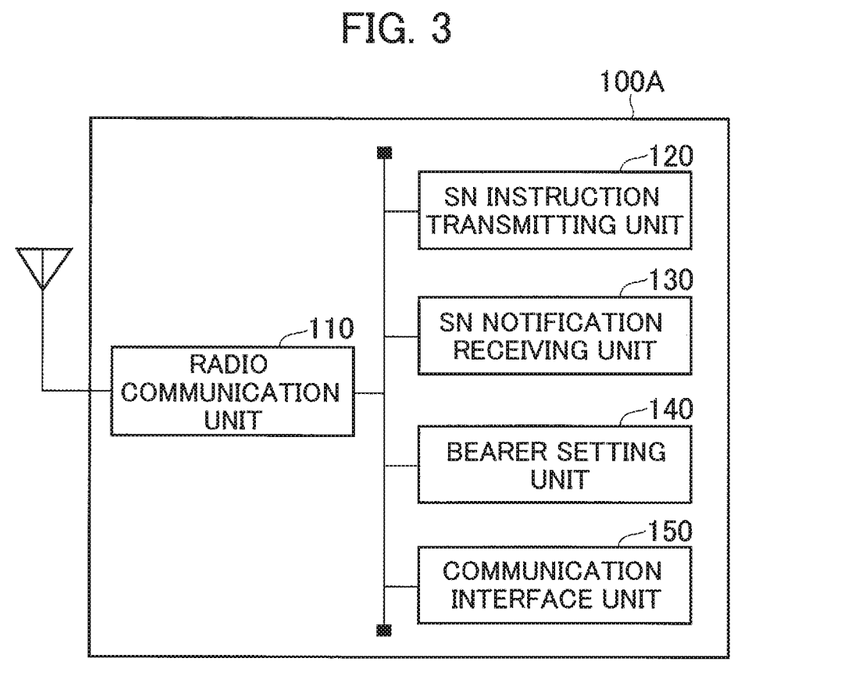
FIG. 3 is a functional block diagram of eNB 100A.

FIG. 3 is a functional block diagram of the eNB 100A. As shown in FIG. 3, the eNB 100A includes a radio communication unit 110, SN instruction transmitting unit 120, SN notification receiving unit 130, a bearer setting unit 140, and a communication interface unit 150.

The radio communication unit 110 executes radio communication according to the LTE system. Specifically, the radio communication unit 110 transmits and receives to and from the UE 200 radio signals according to the LTE system. The radio signal is multiplexed with user data and/or control data.

The SN instruction transmitting unit 120 transmits various instructions to the gNB 100B (SN). Specifically, the SN instruction transmitting unit 120 transmits to the gNB 100B a bearer configuration instruction that instructs whether to configure a split bearer $B_{SP}$ that uses a radio resource between the UE 200 and the gNB 100B (equivalent to other radio base station).

More specifically, the SN instruction transmitting unit 120 transmits to the gNB 100B an inter-node message including Use of SCG Radio Resource that is an information element (IE). The inter-node message is a message transmitted and received between the MeNB~SgNB (see 3GPP TS 37.340) in E-UTRAN-NR Dual Connectivity (EN-DC).

Specifically, the SN instruction transmitting unit 120 can transmit SGNB ADDITION REQUEST including the Use of SCG Radio Resource in a procedure for adding the SgNB (SgNB Addition Preparation).

In addition, the SN instruction transmitting unit 120 can transmit SGNB MODIFICATION REQUEST including the Use of SCG Radio Resource in a procedure for changing the configuration of the SgNB (MeNB initiated SgNB Modification Preparation). Note that, the SN instruction transmitting unit 120 can transmit SGNB RELEASE REQUEST including the Use of SCG Radio Resource in MeNB initiated SgNB Release that is a type of a procedure for changing the configuration of the SgNB.

The specific contents of the Use of SCG Radio Resource will be explained later.

The SN notification receiving unit 130 receives various notifications from the gNB 100B (SN). Specifically, the SN notification receiving unit 130 receives a notification relating to a configuration of the split bearer $B_{SP}$ in the gNB 100B.

More specifically, the SN notification receiving unit 130 receives a bearer configuration notification indicating whether to configure a split bearer $B_{SP}$ that uses the radio resource (frequency, time, space, etc.) between the UE 200 and the gNB 100B.

That is, the bearer configuration notification indicates whether to use a split bearer $B_{SP}$ (Option 2x shown in FIG. 2B) that is set only in a section constituted by the core network 20, the gNB 100B, the eNB 100A, and the UE 200.

Specifically, the SN notification receiving unit 130 can receive from the gNB 100B, as a response to the SGNB ADDITION REQUEST, SGNB ADDITION REQUEST ACKNOWLEDGE including the Use of SCG Radio Resource.

Moreover, the SN notification receiving unit 130 can receive from the gNB 100B, as a response to the SGNB MODIFICATION REQUEST, SGNB MODIFICATION REQUEST ACKNOWLEDGE including the Use of SCG Radio Resource.

It is allowable that the SN notification receiving unit 130 receives, from the gNB 100B, SGNB MODIFICATION REQUIRED including the Use of SCG Radio Resource, SGNB CHANGE REQUIRED including the Use of SCG Radio Resource, or SGNB RELEASE REQUIRED including the Use of SCG Radio Resource.

The bearer setting unit 140 sets the split bearer $B_{SP}$ based on the bearer configuration notification (Use of SCG Radio Resource) received by the SN notification receiving unit 130.

Specifically, when it is instructed to configure the split bearer $B_{SP}$ that uses the radio resource between the UE 200 and the gNB 100B based on the Use of SCG Radio Resource received from the gNB 100B, the bearer setting unit 140 recognizes that the gNB 100B can configure the split bearer. $B_{SP}$ (Option 2x, 3x) shown in FIG. 25 and FIG. 2C.

Therefore, even when the UE 200 moves outside the coverage of the cell C2, the bearer setting unit 140 does not switch the path in the section constituted by the core network 20~gNB 100B to the path of the core network 20~eNB 100A, but maintains the configuration of the split bearer $B_{SP}$. That is, even when the UE 200 that is executing the EN-DC moves outside the coverage of the cell C2, the split bearer $B_{SP}$ (Option 3x) shown in FIG. 2C is only replaced with the split bearer $B_{SP}$ (Option 2x) shown in FIG. 2B.

On the other hand, when it is instructed to not (cannot) configure the split bearer $B_{SP}$ that uses the radio resource between the UE 200 and the gNB 100B based on the Use of SCG Radio Resource received from the gNB 100B, the bearer setting unit 140 recognizes that the gNB 100B cannot configure the split bearer $B_{SP}$ (Option 2x) shown in FIG. 25.

Therefore, when the UE 200 moves outside the coverage of the cell C2, the bearer setting unit 140 switches the path in the section constituted by the core network 20~0 gNB 100B to the path of the core network 20~eNB 100A.

The communication interface unit 150 provides an interface (X interface) necessary for communication between the eNB 100A~gB 100B and an interface (S1-U interface) necessary for communication between the eNB 100A~core network 20.

(2.2) gNB 100B

Figure 4:
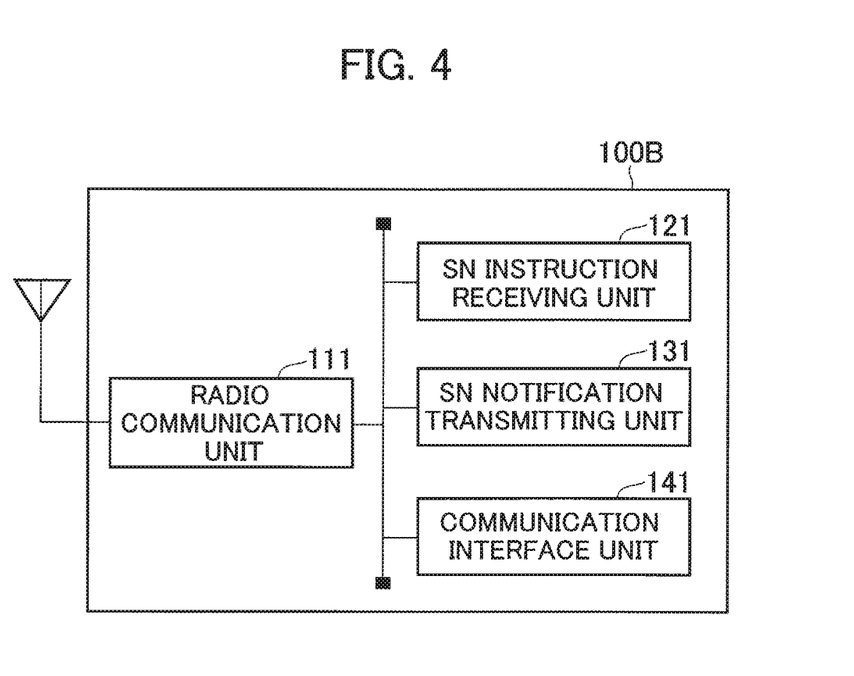
FIG. 4 is a functional block diagram of gNB 100B.

FIG. 4 is a functional block diagram of the gNB 100B. As shown in FIG. 4, the gNB 100B includes a radio communication unit 111, SN instruction receiving unit 121, SN notification transmitting unit 131, and a communication interface unit 141.

The radio communication unit 111 performs radio communication according to the NR system. Specifically, the radio communication unit 111 transmits and receives to and from the UE 200 radio signals according to the NR system. The radio signal is multiplexed with user data or control data.

The SN instruction receiving unit 121 receives the bearer configuration instruction transmitted from the eNB 100A. Specifically, the SN instruction receiving unit 121 receives an inter-node message including the Use of SCG Radio Resource.

More specifically, the SN instruction receiving unit 121 can receive the SGNB ADDITION REQUEST including the Use of SCG Radio Resource or the SGNB MODIFICATION REQUEST including the Use of SCG Radio Resource. Moreover, the SN instruction receiving unit 121 can receive the SGNB RELEASE REQUEST including the Use of SCG Radio Resource.

The SN notification transmitting unit 131 transmits to the eNB 100A a bearer configuration notification indicating whether to configure a split bearer $B_{SP}$ that uses the radio resource (frequency, time, space, etc.) between the UE 200 and the gNB 100B.

Specifically, the SN notification transmitting unit 131 can transmit the SGNB ADDITION REQUEST ACKNOWLEDGE including the Use of SCG Radio Resource or the SGNB MODIFICATION REQUEST ACKNOWLEDGE including the Use of SCG Radio Resource.

More specifically, the SN notification transmitting unit 131 transmits, as a response to the SGNB ADDITION REQUEST, the SGNB ADDITION REQUEST ACKNOWLEDGE including the Use of SCG Radio Resource. Similarly, the SN notification transmitting unit 131 transmits, as a response to the SGNB MODIFICATION REQUEST, the SGNB MODIFICATION REQUEST ACKNOWLEDGE including the Use of SCG Radio Resource.

Moreover, the SN notification transmitting unit 131 can transmit the above-explained bearer configuration notification in a procedure for requesting the change of the configuration of the gNB 100B (SgNB initiated SgNB Modification, SgNB Change or SgNB initiated SgNB Release).

More specifically, it is allowable that the SN notification transmitting unit 131 transmits the SGNB MODIFICATION REQUIRED including the Use of SCG Radio Resource, the SGNB CHANGE REQUIRED including the Use of SCG Radio Resource, or the SGNB RELEASE REQUIRED including the Use of SCG Radio Resource.

In accordance with the bearer configuration instruction received by the SN instruction receiving unit 121, that is, the inter-node message including the Use of SCG Radio Resource, the SN notification transmitting unit 131 can transmit the bearer configuration notification to the radio base station.

The communication interface unit 141 provides an interface (X interface) necessary for communication between the eNB 100A~gNB 100B and an interface (S1-U interface) necessary for communication between the gNB 100B~core network 20.

(3) Operation of Radio Communication System

An operation of the radio communication system 10 will be explained below. Specifically, an operation to notify from the gNB 100B to the eNB 100A whether to configure the split bearer $B_{SP}$ that uses the radio resource between the UE 200~gNB 100B by using the inter-node message transmitted and received between the eNB 100A and the gNB100B will be explained.

The inter-node message used in the following procedures (SgNB Addition Preparation, MeNB initiated SgNB Modification Preparation, and SgNB initiate SgNB Modification) is specified in 3GPP TS 37.3410 and the like.

(3.1) Operation Example 1

Figure 5:
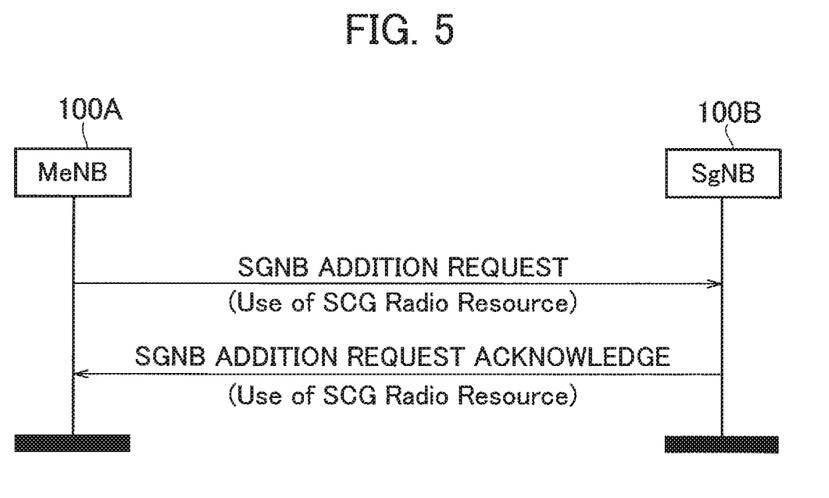
FIG. 5 is a diagram showing a sequence (Operation Example 1) for transmitting a bearer configuration notification (Use of SCG Radio Resource) in a procedure for adding SgNB (SgNB Addition Preparation).

FIG. 5 shows a sequence (Operation Example 1) for transmitting the bearer configuration notification (Use of SCG Radio Resource) in a procedure for adding the SgNB (SgNB Addition Preparation).

As shown in FIG. 5, the eNB 100A transmits to the gNB 100B the SGNB ADDITION REQUEST including the Use of SCG Radio Resource (bearer configuration instruction).

Table 1 shows the contents of the Use of SCG Radio Resource that is the IE included in the SGNB ADDITION REQUEST.

TABLE 1

| IE/Group Name | Presence | Range | IE type and reference | Semantics description | Criticality | Assigned Criticality |
|---|---|---|---|---|---|---|
| E-RABs To Be Added List | 1 | | | | YES | reject |
| >E-RABs To Be Added Item | | 1 ... <maxnoof Bearers> | | | EACH | reject |
| . | | | | | | |
| . | | | | | | |
| . | | | | | | |
| >>>> Use of SCG Radio Resource | O | | BOOLEAN | TRUE corresponds to use NR radio resource and FALSE corresponds not to use NR radio resource | — | — |

As shown in Table 1, when TURE is set as the Use of SCG Radio Resource, it means that the SCG Radio Resource ("NR Radio Resource" in the table) is used, and when FALSE is set as the Use of SCG Radio Resource, it means that the SCG Radio Resource (NR Radio Resource) is not used.

Also, as shown in Table 1, Option (O) is set as the Use of SCG Radio Resource included in the SGNB ADDITION REQUEST. That is, the SGNB ADDITION REQUEST does not need to include the Use of SCG Radio Resource. As a result, the eNB 100A can instruct the gNB 100B explicitly whether to use the SCG Radio Resource.

In response to the received SGNB ADDITION REQUEST, the gNB 100B returns to the eNB 100A the SGNB ADDITION REQUEST ACKNOWLEDGE including the Use of SCG Radio Resource.

Table 2 shows the contents of the Use of SCG Radio Resource that is the IE included in the SGNB ADDITION REQUEST ACKNOWLEDGE.

TABLE 2

| IE/Group Name | Presence | Range | IE type and reference | Semantics description | Criticality | Assigned Criticality |
|---|---|---|---|---|---|---|
| E-RABs Admitted To Be Added | | 1 | | | YES | reject |
| >E-RABs Admitted To Be Added Item | | 1 . . . <maxnoof Bearers> | | | EACH | reject |
| . | | | | | | |
| . | | | | | | |
| . | | | | | | |
| >>>> Use of SCG Radio Resource | M | | BOOLEAN | TRUE corresponds to use NR radio resource and FALSE corresponds not to use NR radio resource | — | — |

As shown in Table 2, when TRUE is set as the Use of SCG Radio Resource, it means that the SCG Radio Resource ("NR Radio Resource" in the table) is used, and when FALSE is set as the Use of SCG Radio Resource, it means that the SCG Radio Resource (NR Radio Resource) is not used.

Also, as shown in Table 2, Mandatory (M) is set as the Use of SCG Radio Resource included in the SGNB ADDITION REQUEST ACKNOWLEDGE. That is, the SGNB ADDITION REQUEST ACKNOWLEDGE always contains the Use of SCG Radio Resource. As a result, the gNB 100B can notify the eNB 100A whether to use the SCG Radio Resource.

(3.2) Operation Example 2

Figure 6:
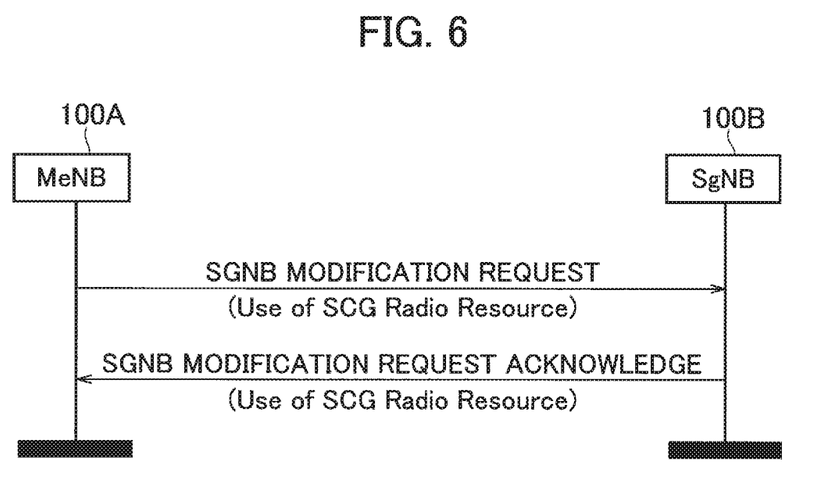
FIG. 6 is a diagram showing a sequence (Operation Example 2) for transmitting a bearer configuration notification (Use of SCG Radio Resource) in procedure for changing a configuration of the SgNB (MeNB initiated SgNB Modification Preparation).

FIG. 6 shows a sequence (Operation Example 2) for transmitting the bearer configuration notification (Use of SCG Radio Resource) in a procedure for changing a configuration of the SgNB (MeNB initiated SgNB Modification Preparation). The procedure that is different from Operation Example 1 will be mainly explained below.

As shown in FIG. 6, the eNB 100A transmits to the gNB 100B the SGNB MODIFICATION REQUEST including the Use of SCG Radio Resource (bearer configuration instruction).

Table 3 shows the contents of the Use of SCG Radio Resource that is the IE included in the SGNB MODIFICATION REQUEST.

TABLE 3

| IE/Group Name | Presence | Range | IE type and reference | Semantics description | Criticality | Assigned Criticality |
|---|---|---|---|---|---|---|
| >E-RABs To Be Added List | | 0 . . . 1 | | | — | — |
| >E-RABs To Be Added Item | | 1 . . . <maxnoof Bearers> | | | EACH | ignore |
| . | | | | | | |
| . | | | | | | |
| . | | | | | | |
| >>>> Use of SCG Radio Resource | O | | BOOLEAN | TRUE corresponds to use NR radio resource and FALSE corresponds not to use NR radio resource | — | — |
| . | | | | | | |
| . | | | | | | |
| . | | | | | | |
| >E-RABs To Be Modified List | | 0 . . . 1 | | | — | — |
| >>E-RABs To Be Modified Item | | 1 . . . <maxnoof Bearers> | | | EACH | ignore |
| . | | | | | | |
| . | | | | | | |
| . | | | | | | |
| >>>> Use of SCG Radio Resource | O | | BOOLEAN | TRUE corresponds to use NR radio resource and FALSE corresponds not to use NR radio resource | — | — |

As shown in Table 3, the contents of the Use of SCG Radio Resource is almost the same as the Use of SCG Radio Resource shown in Table 1. As shown in Table 3, the Use of SCG Radio Resource is included under >E-RABs To Be Added List, or under >E-RABs To Be Modified List.

In response to the received SGNB MODIFICATION REQUEST, the gNB 100B returns to the eNB 100A the SGNB MODIFICATION REQUEST ACKNOWLEDGE including the Use of SCG Radio Resource.

Table 4 shows the contents of the Use of SCG Radio Resource that is the IE included in the SGNB MODIFICATION REQUEST ACKNOWLEDGE.

TABLE 4

| IE/Group Name | Presence | Range | IE type and reference | Semantics description | Criticality | Assigned Criticality |
|---|---|---|---|---|---|---|
| E-RABs Admitted List | | 0 . . . 1 | | | YES | ignore |
| >E-RABs Admitted To Be Added List | | 1 | | | — | — |
| >>E-RABs Admitted To Be Added Item | | 1 . . . <maxnoof Bearers> | | | EACH | ignore |
| . | | | | | | |
| . | | | | | | |
| . | | | | | | |
| >>>> Use of SCG Radio Resource | M | | BOOLEAN | TRUE corresponds to use NR radio resource and FALSE corresponds not to use NR radio resource | — | — |
| . | | | | | | |
| . | | | | | | |
| . | | | | | | |
| >E-RABs Admitted To Be Modified List | | 0 . . . 1 | | | — | — |
| >>E-RABs Admitted To Be Modified Item | | 1 . . . <maxnoof Bearers> | | | EACH | ignore |
| . | | | | | | |
| . | | | | | | |
| . | | | | | | |
| >>>> Use of SCG Radio Resource | M | | BOOLEAN | TRUE corresponds to use NR radio resource and FALSE corresponds not to use NR radio resource | — | — |

(3.3) Operation Example 3

Figure 7:
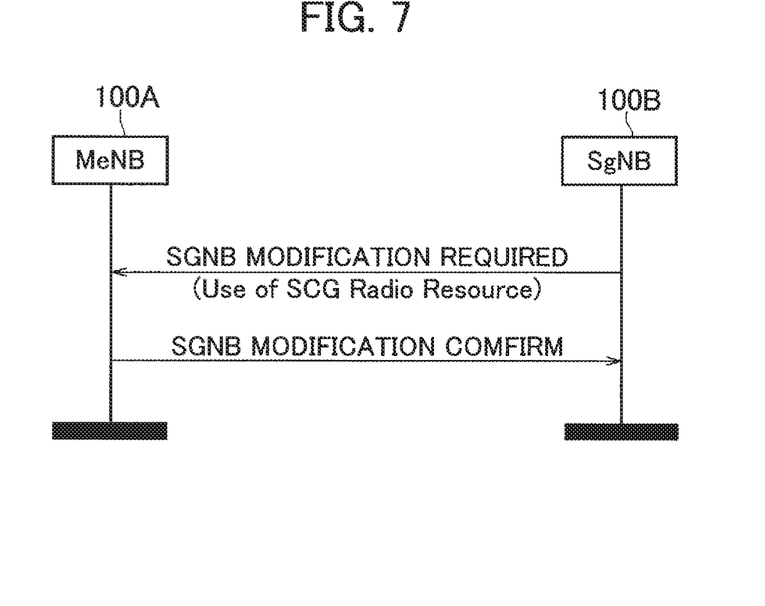
FIG. 7 is a diagram showing a sequence (Operation Example for transmitting a bearer configuration notification (Use of SCG Radio Resource) in a procedure for changing the configuration of the SgNB (SgNB initiated SgNB Modification).

FIG. 7 shows a sequence (Operation Example 2) for transmitting the bearer configuration notification (Use of SCG Radio Resource) in a procedure for changing the configuration of the SgNB (SgNB initiated SgNB Modification). The procedure that is different from Operation Example 1 will be mainly explained below.

As shown in FIG. 7, the gNB 100B transmits to the gNB 100B the SGNB MODIFICATION REQUIRED including the Use of SCG Radio Resource (bearer configuration notification).

Table 5 shows the contents of the Use of SCG Radio Resource that is the IE included in the SGNB MODIFICATION REQUIRED.

TABLE 5

| IE/Group Name | Presence | Range | IE type and reference | Semantics description | Criticality | Assigned Criticality |
|---|---|---|---|---|---|---|
| E-RABs To Be Modified List | | 0 . . . 1 | | | YES | ignore |
| >E-RABs To Be Modified item | | 1 . . . <maxnoof Bearers> | | | EACH | ignore |
| . | | | | | | |
| . | | | | | | |
| . | | | | | | |

TABLE 5-continued

| IE/Group Name | Presence | Range | IE type and reference | Semantics description | Criticality | Assigned Criticality |
|---|---|---|---|---|---|---|
| >>>> Use of SCG Radio Resource | M | | BOOLEAN | TRUE corresponds to use NR radio resource and FALSE corresponds not to use NR radio resource | — | — |

Based on the received SGNB MODIFICATION REQUIRED, the eNB 100A changes the setting of the gNB 100B including the configuration of the split bearer $B_{SP}$. In addition, the eNB 100A returns SGNB MODIFICATION CONFIRM to the gNB 100B based on the received SGNB MODIFICATION REQUIRED.

(3.4) Other Operation Examples

The gNB 100B can notify the eNB 100A of the Use of SCG Radio Resource by employing some other inter-node message, that is, a message different from the inter-node message mentioned in Operation Examples 1 to 3 explained above. Specifically, as explained above, the SGNB CHANGE REQUIRED including the Use of SCG Radio Resource or the SGNB RELEASE REQUIRED including the Use of SCG Radio Resource can be transmitted.

Furthermore, when a failure of a radio link or degradation of a communication quality related to the secondary cell group (SCG) occurs, the gNB 100B uses the above-explained message to notify the eNB 100A that it is possible to use the configuration of the split bearer $B_{SP}$ (Option 2x shown in FIG. 2B) that does not use the radio resource between the UE 200 and the gNB 100B. In this case, the gNB 100B can notify the eNB 100A that it is possible to use the configuration of the split bearer (Option 3x shown in FIG. 2C) that uses the radio resource between the UE 200 and the gNB 100B once the failure recovers or the degradation of the communication quality is resolved. Also, the eNB 100A can transmit to the gNB 100B the SGNB RELEASE REQUEST including the Use of SCG Radio Resource.

(4) Advantageous Effects

The following advantageous effects can be achieved with the above-explained embodiments. More specifically, the gNB 100B transmits to the eNE 100A the inter-node message including the Use of SCG Radio Resource (bearer configuration notification) that indicates whether to configure the split bearer $B_{SP}$ that uses the radio resource between the UE 200 and the gNB 100B.

The eNB 100A sets the split bearer $B_{SP}$ based on the Use of SCG Radio Resource received from the gNB 100B.

Therefore, the eNB 100A can recognize which split bearer $B_{SP}$ (Option 2x or Option 3x) configuration the gNB 100B is to use. As a result, even when the UE 200 moves outside the coverage of the cell C2 formed by the gNB 100B, the situation in which the path of the core network 20~gNB 100B section is switched to the path of the core network 20~eNB 100A, that is, the bearer configuration change can be prevented. Because the bearer configuration is not changed, a significant technical effect, for example, reduction in the processing load of the core network 20 and the like is achieved.

In the present embodiment, the eNB 100A transmits to the eNB 100A the inter-node message including the Use of SCG Radio Resource that indicates whether to configure the split bearer $B_{SP}$ that uses the radio resource between the UE 200 and the gNB 100B.

For this reason, it is possible to control the configuration of the split bearer $B_{SP}$ (Option 2x or Option 3x) with the lead of the eNB 100A. As a result, it is possible select a highly flexible bearer configuration according to the communication situation and the like.

In the present embodiment, the eNB 100A can transmit the inter-node message including the Use of SCG Radio Resource in the procedure for adding the gNB 100B or in the procedure for changing the configuration of the gNB 100B. Moreover, the gNB 100B can transmit the inter-node message including the Use of SCG Radio Resource in the procedure for changing the configuration of the gNB 100B. Therefore, it is possible to quickly change the configuration of the split bearer $B_{SP}$ at the timing at which there is a need to change the configuration of the split bearer $B_{SP}$.

As explained above, the Use of SCG Radio Resource can be substantially used to indicate whether to use the split bearer $B_{SP}$ (Option 2x) that is set only in the section of the core network 20, the gNB 100B, the eNB 100A, and the UB 200. Therefore, the eNB 100A can be explicitly caused to recognize the change to the split bearer $B_{SP}$ (Option 2x).

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, in the above embodiment, the eNB 100A is a radio base station (eNB) of the LTE system and constitutes a master node, the gNB 100B is a radio base station (gNB) of the NR system and constitutes a secondary node; however, this configuration can be reversed. That is, the radio base station (gNB) of the NR system can constitute the master node and the radio base station (eNB) of the LTE system can constitute the secondary node.

Moreover, the block diagrams used for explaining the embodiments (FIGS. 3 and 4) show functional block diagrams. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 8:
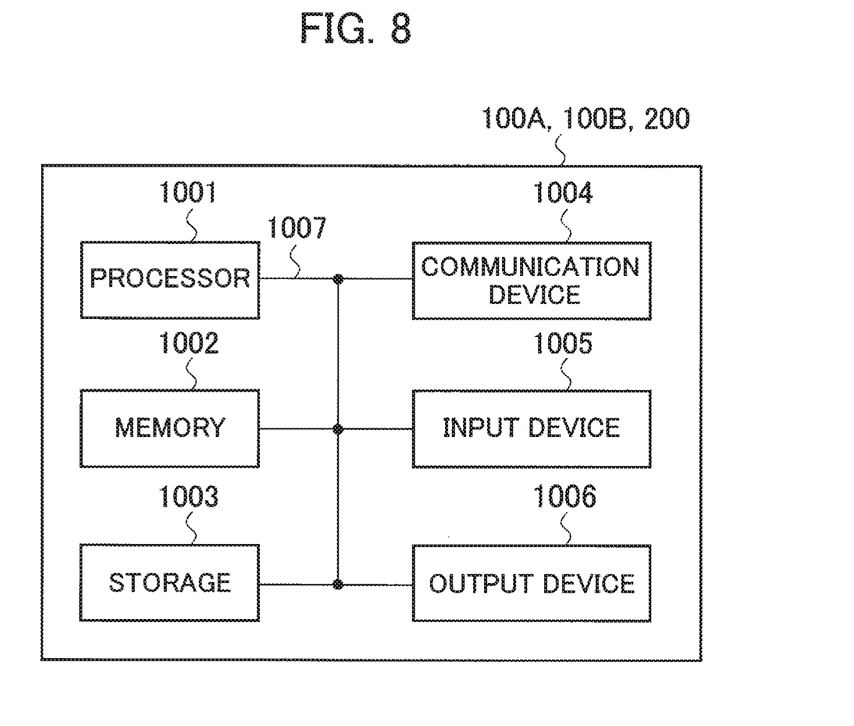
FIG. 8 is a diagram showing an example of the hardware configuration of the eNB 100A and the gNB 100B.

Furthermore, the eNB 100A and the gNB 100B (devices), explained above can function as a computer that performs the transmission power control processing of the present invention. FIG. 8 is a diagram showing an example of a hardware configuration of these devices. As shown in FIG. 8, each of these devices can be configured as a computer device including a processor 1001, a memory 1002, a storage 1003, a communication device 1004, an input device 1005, an output device 1006, a bus 1007, and the like.

The functional blocks of the devices (see FIGS. 3 and 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called RRC message, and the RRC signaling can be, for example, RRC Connection Setup message, RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100A (gNB 100B, same holds true in the below explanation) can be performed by another network node (device). Moreover, functions of the eNB 100 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The eNB 100A (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The UE 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

EXPLANATION OF REFERENCE NUMERALS 10 radio communication system
20 core network
100A eNB
100B gNB
110, 111 radio communication unit
120 SN instruction transmitting unit
121 SN instruction receiving unit
130 SN notification receiving unit
131 SN notification transmitting unit
140 bearer setting unit
141 communication interface unit
150 communication interface unit
200 UE
1001 processor
1002 memory
1003 storage
1004 communication device
1005 input device
1006 output device
1007 bus

The invention claimed is:

1. A radio communication system comprising a core network, a terminal, a MeNB included in a master cell group, and a SgNB included in a secondary cell group, wherein
a split bearer is set in the radio communication system, the split bearer passing from the core network to the secondary cell group and branching from the SgNB to the MeNB,
data is transmitted to the terminal via the split bearer,
the SgNB includes a notification transmitter that transmits to the MeNB a bearer configuration notification that indicates whether to configure the split bearer that uses a radio resource between the terminal and the SgNB, and
the MeNB includes
a notification receiver that receives the bearer configuration notification, and
a processor that sets the split bearer based on the bearer configuration notification received by the notification receiver,
wherein
the notification transmitter transmits the bearer configuration notification in a procedure of requesting a change of configuration of the SgNB,
the MeNB includes an instruction transmitter that transmits to the SgNB a bearer configuration instruction,
the SgNB includes an instruction receiver that receives the bearer configuration instruction that instructs whether to configure the split bearer that uses the radio resource between the terminal and the SgNB,
the notification transmitter transmits to the MeNB the bearer configuration notification based on the bearer configuration instruction received by the instruction receiver,
the instruction transmitter transmits the bearer configuration instruction in a procedure for changing the configuration of the SgNB, and
the SgNB transmits an inter-node message that includes radio resource information of the secondary cell group to the MeNB.

2. The radio communication system as claimed in claim 1, wherein the instruction transmitter transmits the bearer configuration instruction in a procedure for adding the SgNB.

3. The radio communication system as claimed in claim 2, wherein the bearer configuration notification indicates whether to use the split bearer that is set only in a section constituted by the core network, the SgNB, the MeNB, and the terminal.

4. The radio communication system as claimed in claim 1, wherein the bearer configuration notification indicates whether to use the split bearer that is set only in a section constituted by the core network, the SgNB, the MeNB, and the terminal.

5. The radio communication system as claimed in claim 1, wherein the bearer configuration notification indicates whether to use the split bearer that is set only in a section constituted by the core network, the SgNB, the MeNB, and the terminal.

6. A SgNB in communication with a core network, a MeNB, and a terminal included in a radio communication system, wherein the SgNB is included in a secondary cell group, and the MeNB is included in a master cell group, wherein a split bearer is set in the radio communication system, the split bearer passing from the core network to the secondary cell group and branching from the SgNB to the MeNB, and wherein data is transmitted to the terminal via the split bearer, the SgNB comprising:
a notification transmitter that transmits to the MeNB a bearer configuration notification that indicates whether to configure the split bearer that uses a radio resource between the terminal and the SgNB, and
an instruction receiver that receives a bearer configuration instruction that instructs whether to configure the split bearer that uses the radio resource between the terminal and the SgNB,
wherein the notification transmitter transmits the bearer configuration notification in a procedure of requesting a change of configuration of the SgNB,
wherein the instruction transmitter transmits the bearer configuration instruction in a procedure for changing the configuration of the SgNB, and
wherein the SgNB transmits an inter-node message that includes radio resource information of the secondary cell group to the MeNB.

* * * * *